United States Patent [19]

Mustaklem

[11] Patent Number: 4,982,760
[45] Date of Patent: Jan. 8, 1991

[54] THREE-WAY VALVE WITH RADIAL SEAL
[75] Inventor: Issa Mustaklem, Indianapolis, Ind.
[73] Assignee: Flotec, Inc., Indianapolis, Ind.
[21] Appl. No.: 400,578
[22] Filed: Aug. 30, 1989

Related U.S. Application Data

[63] Continuation-in-part of Ser. No. 266,300, Oct. 31, 1988, which is a continuation of Ser. No. 744,044, Jun. 12, 1985, abandoned.

[51] Int. Cl.$^5$ .................. F16K 11/085; F16K 5/04
[52] U.S. Cl. .................. 137/559; 137/625.47; 251/314; 251/317
[58] Field of Search .................. 137/625.47, 559; 251/314, 317

[56]  References Cited
U.S. PATENT DOCUMENTS

| | | | |
|---|---|---|---|
| 2,970,805 | 2/1961 | Pool | 251/317 X |
| 3,033,515 | 5/1962 | Brisbane | 251/317 X |
| 3,721,265 | 3/1973 | Hoffland | 137/625.47 X |
| 4,014,513 | 3/1977 | Bake et al. | 251/317 |
| 4,704,983 | 11/1987 | Rung | 137/559 X |

Primary Examiner—Arnold Rosenthal

[57] ABSTRACT

A valve assembly for controlling fluid flow through at least three flowlines comprises a housing having a cylindrical central cavity with at least three ports opening therethrough, the housing further having at least three conduits for making fluid connection between the flowlines and a corresponding one of the ports. A flow control signal is rotatably mounted within the central cavity having at least three radial bores therethrough and intersecting therein for completing a fluid path between selected ones of the ports. A radial seal is supported by the spool and is configured to prevent fluid migration into the central cavity from non-selected ones of the ports. The spool can be positioned to complete a flowpath between any two or any three of the flowlines while the non-selected flowline is positively sealed. The housing and spool are composed of a non-opaque or transparent material to permit direct observation of the fluid passing therethrough. The radial seal includes a sealing face having a contour corresponding to the outer cylindrical shape of the spool and a central opening therethrough so that the radial seal sealingly engages the inner wall of the central cavity about one of the ports. The radial seal includes a sealing face which is defined by a dome, having an axis of symmetry, with a cylindrical relief along an axis perpendicular to said axis of symmetry.

10 Claims, 3 Drawing Sheets

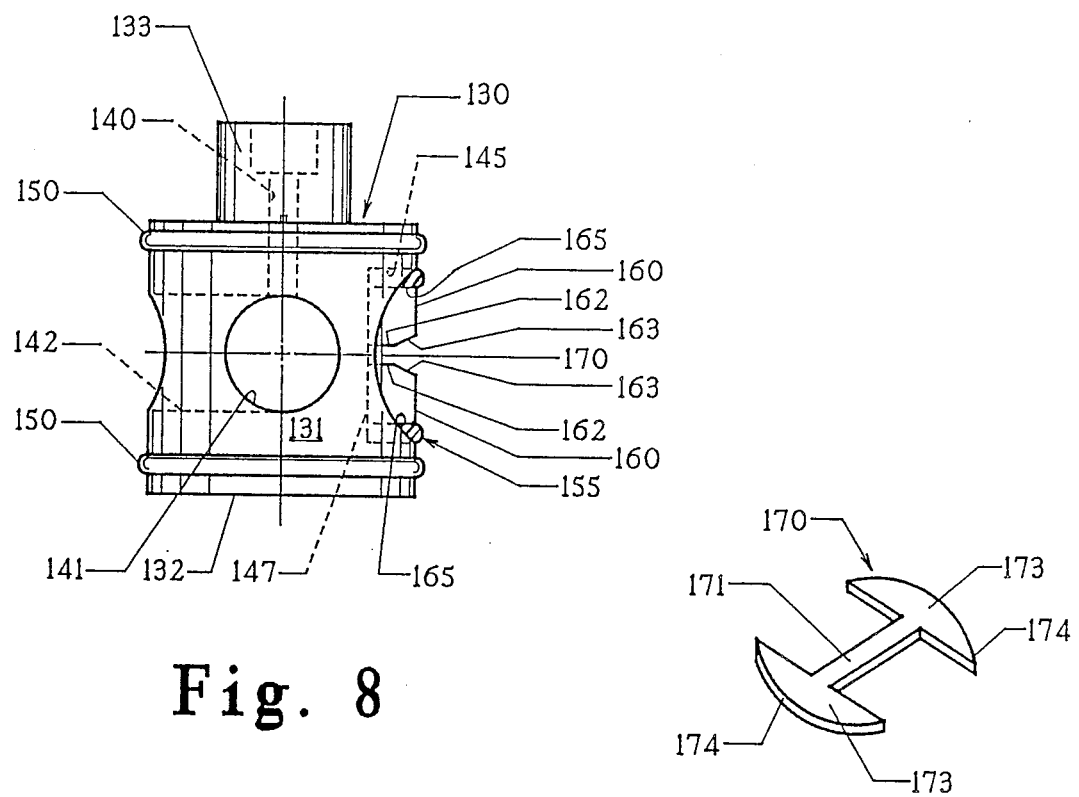
Fig. 8
Fig. 10
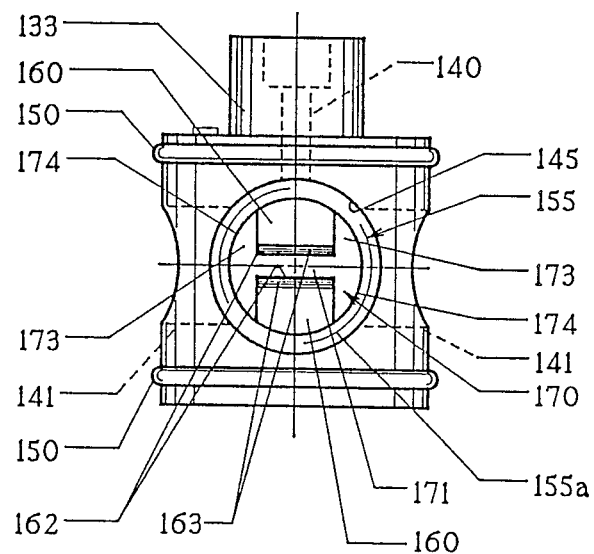
Fig. 9

THREE-WAY VALVE WITH RADIAL SEAL

REFERENCE TO RELATED APPLICATIONS

This application is a continuation-in-part of co-pending U.S. patent application Ser. No. 266,300 entitled RADIAL SEAL, filed on Oct. 31, 1988 now pending, which is a continuation of U.S. patent application Ser. No. 744,044, filed on Jun. 12, 1985, and now abandoned each application of which is assigned to the same assignee of record as the present application.

BACKGROUND OF THE INVENTION

This invention relates to flow control valves for fluids, and particularly control valves of the type having a valve spool.

Fluid control valves are well-known in the prior art. Some valves are adapted to combine two or more flowlines into a single output, such as the three-way mixing valve. It is desirable to have a flow control valve that is capable of connecting three flowlines in fluid communication in any one of the possible combinations of those flowlines. It is also desirable to provide positive sealing for the flowline that remains inactive when the valve is operated. Another desirable feature of control valves for use as mixing valves is the ability to observe the fluid flowing through the valve in order to insure that the fluids are mixing properly and that no air bubbles are trapped in the flowlines. The present invention addresses these and other desirable features in a three-way control valve.

SUMMARY OF THE INVENTION

Thus, it is one object of the invention to provide a flow control valve capable of connecting up to three flowlines in fluid communication. Another object is to connect at least three flowlines in any of the possible combinations of the three lines and to positively seal the inactive flowlines from the active flowlines. Another object is to provide a three-way valve for use as a mixing valve adapted to permit observation of the fluid flowing through the valve.

These and other objects are provided in a valve assembly for controlling fluid flow through at least three flowlines comprising a housing including at least three openings, each of the openings having means for engaging a corresponding one of the flowlines in fluid coupling, a central cavity formed therein having an inner wall defining at least three ports, and a conduit between each of the ports and a corresponding one of the openings. A flow control means is mounted within the central cavity for completing a fluid path between selected ones of the ports. A sealing means is mounted in the flow control means to prevent fluid migration into the central cavity from non-selected ones of the three ports.

The invention further resides in a valve assembly having a flow control means adapted for completing a flowpath between selected combinations of the flowlines. The flow control means can complete a flowpath between any two or any three of the flowlines while the non-selected flowline is positively sealed. In one aspect of the invention, the housing and flow control means are composed of a non-opaque or transparent material to permit direct observation of the fluid passing therethrough.

In another aspect of the invention the flow control means is a cylindrical spool and the sealing means is a resilient radial seal engaging within the spool. The radial seal includes a sealing face having a contour corresponding to the outer cylindrical shape of the spool and a central opening therethrough so that the resilient seal sealingly engages the inner wall of the central cavity about one of the ports.

In another embodiment of the invention, the flow control means comprises a cylindrical spool and the sealing means comprises a radial seal mounted within a recess in the cylindrical face of the spool. Means for retaining the seal within the recess is provided which comprises a pair of spaced apart posts and a removable retainer piece.

Other objects and benefits of the invention will be made apparent by the following description of the preferred embodiments in conjunction with the figures.

BRIEF DESCRIPTION OF THE DRAWINGS

FIG. 8 is an enlarged top elevational view of the valve spool of another embodiment of the invention for use with the valve block of FIG. 1.

FIG. 9 is a side elevational view of the valve spool shown in FIG. 8.

FIG. 10 is a perspective view of the seal retainer of the embodiment shown in FIGS. 9 and 10.

DESCRIPTION OF THE PREFERRED EMBODIMENT

Figure 1:
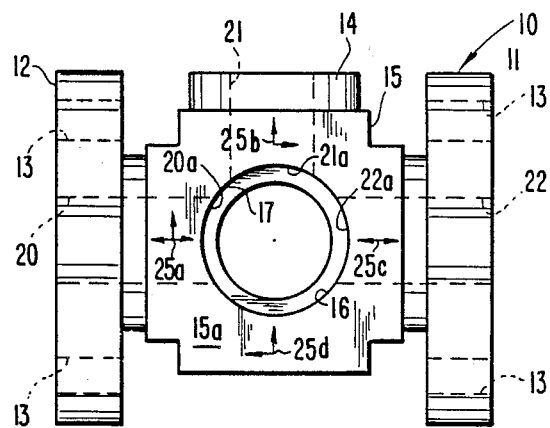
FIG. 1 is a top elevational view of the valve block for use in the control valve of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The control valve of the present invention includes a valve block 10 as illustrated in FIG. 1. The valve block includes a pair of flanges 11 and 12 for mating with complementary flanges associated with a flowline to which the valve block 10 is to be attached. The flanges 11 and 12 include a plurality of bolt holes 13 that may be threaded for engagement to the complementary flowline flange. The valve block 10 also includes a mating boss 14 that can be mated in a suitable fashion to another flowline.

The valve block 10 includes a main body 15 having a central cavity 16 formed therein. At the base of the central cavity 16 is a support shoulder 17. The support shoulder 17 forms a rest or stop for the valve spool 30 shown in FIG. 2. The central cavity 16 has a diameter slightly larger than the valve spool 30 so that the spool fits snugly within the cavity 16 when seal rings are engaged about the spool, as described herein. The valve block 10 is for a three-way control valve, and includes a number of threaded bores 20-22 extending from the exposed surfaces of the valve block to the central cavity 16. The first threaded bore 20 opens at a first port 20a in the central cavity 16. Likewise, second and third threaded bores 21 and 22 open at ports 21a and 22a, respectively, in the central cavity. Each of the bores 20-22 are threaded for engagement to a standard coupling or other hose fitting for the flowlines to be engaged with the valve block 10.

Figure 2:
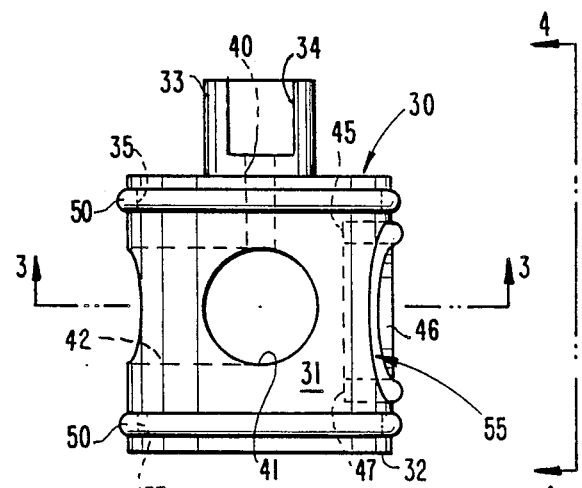
FIG. 2 is an enlarged side elevational view of the valve spool which, in combination with the valve block of FIG. 1, forms the control valve of the present invention.

Referring to FIG. 2, the valve spool 30 is shown as having a cylindrical body 31 with a flat bottom surface 32 that is intended to rest against the support shoulder 17 of the valve block 10. The valve spool 30 includes a spindle 33 projecting from the top surface of the spool, and having an engagement notch 34 formed therein. When the valve spool 30 is assembled within the central cavity 16 of the valve block 10, with the bottom surface 32 of the spool resting against the support shoulder 17 of the valve block, the spindle 33 projects above the top surface 15a of the main body of the valve block 10. Thus, the spindle 33 is accessible outside the valve block 10 to provide a means for rotating the valve spool 30 within the central cavity 16. A lever or other mechanism can engage the notch 34 to provide means for rotating the spool.

The valve spool 30 includes a pair of seal ring grooves 35 at the upper and lower portions of the cylindrical body 31. The seal ring grooves 35 are adapted to receive a pair of seal rings 50 therein. The seal rings 50 may be formed of rubber or some other elastomeric material that is resiliently compressible and adapted for low wear as the valve spool 30 and seal rings 50 are rotated within the central cavity 16 of the valve block 10. The sealing surfaces of the seal rings 50 extend slightly beyond the outer surface of the cylindrical body 31, so that the seal rings form a tight, press-fit engagement within the central cavity 16. The seal rings 50 prevent fluid from escaping from the central cavity between the seal ring grooves 35.

Figure 3:
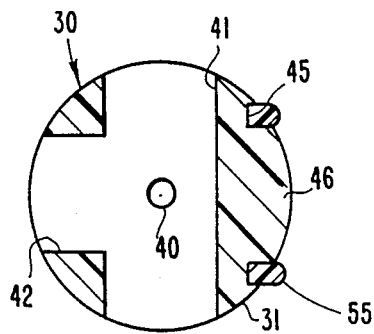
FIG. 3 is a cross-sectional view of the valve spool of FIG. 2 taken along line 3—3 as viewed in the direction of the arrows.

The valve spool 30 includes a vent bore 40 that is formed by drilling from the spindle 33 through the cylindrical body 31 to the center of the valve spool 30. A thru-channel 41 extends along a diameter at the center of the cylindrical body 31, and intersects the vent bore 40. A cross-channel 42 is formed radially in the cylindrical body 31 and intersects the thru-channel 41. Thus, as shown in FIG. 3, the thru-channel 41 and cross-channel 42 form a T-shaped flowpath within the valve spool 30. The vent bore 40 is typically capped or sealed to prevent fluid flow through the vent bore 40. However, when air bubbles are detected in the fluid passing through the control valve, the vent bore can be opened to allow the air bubbles to escape.

The valve spool 30 includes an annular recess 45 formed in the cylindrical body 31 radially opposite the cross-channel 42. A radially outwardly projecting core 46 is situated at the center of the annular recess 45. A flat mounting surface 47 is at the base of the recess 45. Annular recess 45, core 46 and flat mounting surface 47 can be formed in the valve spool 30 by radially coredrilling to a fixed depth into the cylindrical body 31.

Figure 4:
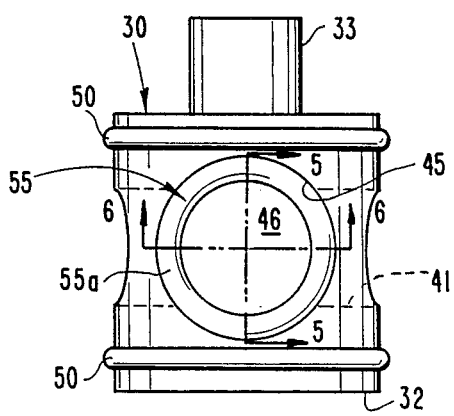
FIG. 4 is a side view of the valve spool shown in FIG. 2 as viewed in the direction of the arrows of line 4—4.

In the assembled valve spool 30, a radial seal 55 is situated within the annular recess 45 abutting the flat mounting surface 47 and core 46. As shown in FIG. 4, the radial seal is circular and includes a sealing face 55a that projects slightly outwardly from, but parallel to, the surface of the cylindrical body 31. The sealing face 55a of the radial seal has a contoured shape to conform to the contour of the annular recess 45 and cylindrical body 31, as well as the interior surface of the central cavity 16 against which the radial seal 55 is sealingly engaged when the valve spool 30 is within the central cavity.

Figure 6:
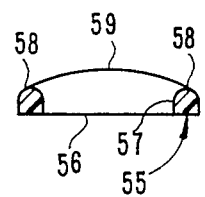
FIG. 6 is a cross-sectional view of the radial seal shown in FIG. 4 taken along 6—6 as viewed in the direction of the arrows, with the projecting core removed for clarity.
Figure 5:
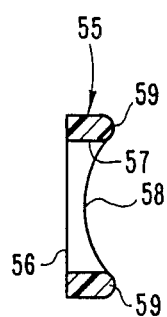
FIG. 5 is a cross-sectional view of the radial seal for use with the valve spool shown in FIG. 4, with the projecting core of the valve spool removed for clarity.

As illustrated in FIGS. 5 and 6, the radial seal 55 includes a flat bottom face 56 that abuts the flat mounting surface 47 of the annular recess 45. A central opening 57 in the radial seal 55 is sized to accommodate the projecting core 46 in a tight-fitting relationship. The perimeter of the radial seal, that is the sealing face 55a, forms a pair of diametrically opposite valleys 58, and a pair of diametrically opposite crests 59 on the radial seal. The valleys 58 and crests 59 are interspersed at 90° intervals so that when the radial seal 55 is situated within the annular recess 45, the sealing face 55a of the radial seal conforms to the outer surface of the valve spool 30, as well as the inner surface of the central cavity 16. The sealing face, and thus the valleys and crests, is essentially defined by a dome having an axis of symmetry with a cylindrical relief in the dome along an axis perpendicular to the axis of symmetry. The configuration of the radial seal 55 provides a positive sealing surface against the central cavity 16, and particularly about the ports 20a-22a. The diameter of the central opening 57 of the sealing face 55a of the radial seal is larger than the diameter of the ports 20a-22a so that the radial seal 55 is sealingly engaged around a particular port when the port is to be closed to flow through the control valve. Thus, fluid migration from the nonselected port into the central cavity is prevented.

In the preferred embodiment, the radial seal 55 is composed of 80 Duro neoprene. In addition, the valve spool 30 can be composed of polyvinylchloride or other similar plastic material. The valve body 10 can be composed of polyvinylchloride or 40% filled polypropylene in one preferred embodiment of the present invention. In another embodiment of the invention, the valve block 10 is composed of acrylic or other transparent material. The transparent valve body 10 accomplishes yet another object of the invention in that fluid flowing through the threaded bores 20-22 can be directly observed from outside the control valve. For instance, when antifreeze is to be mixed with a particular fluid, the mixing of the antifreeze with the other fluid can be directly observed through the transparent control valve block 10 to insure that the fluids are being properly combined. In addition, the transparent valve block allows observation for the presence of air bubbles within the flowlines, which can be vented through vent bore 40 as previously described. The transparent valve block 10 also allows for observation of any leakage through the radial seal 55 into one of the ports that is to be closed in the operation of the control valve.

The three-way valve of the present invention, and in particular the T-shaped flowpath through the valve spool 30, can be moved to four positions depending upon which ones of the three flowlines are to be fluid coupled. The valve 10 permits fluid connection between the flowlines in any one of the possible combinations of the flowlines. The top face 15a of the main body 15 of the valve block 10, as shown in FIG. 1, includes four position indicators 25A–25D. When a corresponding indicator arrow (not shown) on the valve spool 30 is aligned with any one of the position indicators 25A–25D, the T-shaped flowpath through the cylindrical body 31 is aligned as indicated by the arrows of the position indicators 25A–25D.

Figure 7:
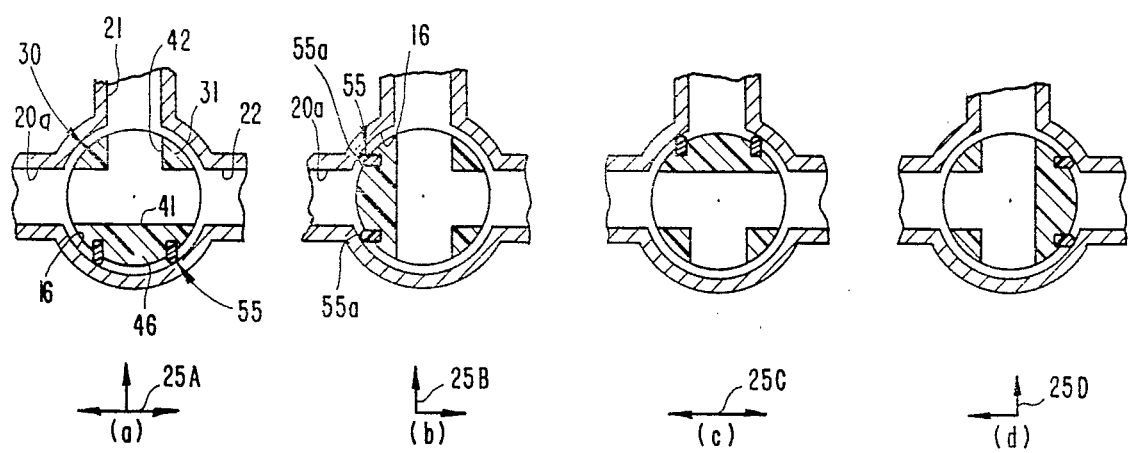
FIGS. 7(a)-(d) is a graphical representation of the four positions of the three-way valve of the present invention with the radial seal exaggerated for clarity to show the sealing feature of the present invention.

Referring to FIG. 7, when the valve spool 30 is aligned with position indicator 25A, the T-shaped flowpath through the cylindrical body 31 joins each of the bores 20–22 so that fluid flows through each of the three flowlines. When the valve spool 30 is rotated to position indicator 25B, only bores 21 and 22 are fluid coupled. In this position, the sealing face 55a of the radial seal 55 engages the inner face of cylindrical bore 16 about the first port 20A of the first flowline. Thus, fluid is prevented from passing to or from the first flowline engaged to the first threaded bore 20. As the valve spool 30 is rotated to positions 25C and 25D, the second port 21A and the third port 22A, respectively, are sealed, while fluid flows between the unsealed ports through the T-shaped flowpath in the cylindrical body 31. Thus, it is seen that the valve spool 30 and its thru-channel 41 and cross-channel 42 provide means for connecting each of the three flowlines in fluid engagement in each of the four possible combinations of these three flowlines.

In another embodiment of the present invention, a valve spool 130 is provided that is in most respects similar to the valve spool 30 described above. The spool 130, illustrated in FIGS. 8 and 9, includes a bottom surface 132, spindle 133, vent bore 140, thru-channel 141, cross-channel 142 and seal rings 150 that are identical to their counterparts in spool 30. The cylindrical body 131 of spool defines a radial seal mounting region formed by a circular recess 145 having a flat mounting surface 147 within the body 131. Extending from the flat surface 147 are a pair of posts 160 spaced equidistant from the center of the circular recess 145. The posts each include an inner face 162 which defines a channel between the posts. A chamfer 163 is formed at the outer portion of the inner face 162 of each post 160. Each post includes a partial circumferential outer face 165. As illustrated in FIGS. 8 and 9, the radial seal 155, which is identical to the radial seal 55, is situated within the recess 145 between the circumferential wall of the recess and the outer faces 165 of the posts 160.

A seal retainer 170 is provided to firmly retain the radial seal 155 in its sealing position within the recess 145. As the valve spool 130 is rotated from position to position, friction forces acting on the radial seal 155 try to pull the seal out of the recess 145. In addition, fluid pressure exerted on the sealing face 155a of the seal also tends to try to lift the seal out of the recess. The seal retainer 170 is provided to stablize the radial seal and prevent the seal from being lifted out of the recess 145.

As shown more clearly in FIG. 10, the seal retainer 170 includes a cross bar 171. The cross bar 171 has a width slightly less than the spacing between the inner faces 162 of the two posts 160. At the ends of the cross bar 171 are a pair of tabs 173 that have a partially circular retaining face 174. The seal retainer 170 is inserted between the posts 160 using the chamfers 163 on either post to help guide the cross bar 171 into the channel between the posts. The retaining faces 174 of each end tab 173 press against the inner circumference of the radial seal 155 to trap the seal within the recess 145. The retaining faces 174 of the seal retainer 170 may have an effective outer diameter that is slightly larger than the effective diameter of the outer faces 165 of the posts 160 to further enhance the retentive ability of the retainer 170. The seal retainer 170 is preferably composed of the same material as the valve spool 130.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A valve assembly for controlling fluid flow through at least three flowlines, comprising:
   a housing including;
      at least three openings, each of said openings having means for engaging a corresponding one of said at least three flowlines in fluid coupling;
      a central cavity formed therein having an inner wall defining at least three ports; and
      a bore between each of said at least three ports and a corresponding one of said at least three openings;
   flow control means, mounted within said central cavity, for completing a fluid path between at least two selected ones of said at least three ports;
   a radial seal mounted in said flow control means for preventing fluid migration into said central cavity from non-selected ones of said at least three ports, said radial seal having a sealing face adapted to sealingly engage said inner wall of said central cavity about one of said at least three ports, and further having an inner circumferential surface; and
   a seal retainer removably engaged within said radial seal and having a seal engaging face for press-fit engagement with said inner circumferential surface.

2. The valve assembly of claim 1, wherein:
   said central cavity is cylindrical; and
   said flow control means includes:
      a cylindrical spool having at least three radial bores therethrough, each of said at least three bores intersecting inside said spool; and
      means for rotating said spool within said central cavity to selectably align at least two of said bores with a corresponding number of said ports.

3. The valve assembly of claim 2, wherein:
   said at least three ports consists of a first port, a second port and a third port spaced 90° apart from each other; and
   said at least three bores consists of a first bore, a second bore and a third bore spaced 90° apart from each other.

4. The valve assembly of claim 1, wherein said sealing face of said radial seal is defined by a dome, having an axis of symmetry, with a cylindrical relief along an axis perpendicular to said axis of symmetry.

5. The valve assembly of claim 1, wherein said housing and said flow control means is non-opaque to permit direct observation of fluid flowing through said flow control means.

6. The valve assembly of claim 1, wherein said flow control means includes means for completing said fluid path between ports in each of the possible combinations of said at least three ports.

7. The valve assembly of claim 6, wherein:
said at least three ports consists of a first port, a second port and a third port;
said flow control means includes means for completing a flowpath selected from the group consisting of a first flowpath between each of said first, second and third ports, a second flowpath between said first and second ports, a third flowpath between said second and third ports, and a fourth flowpath between said first and third ports,
whereby when said second flowpath is selected said third port is sealed by said sealing means, when said third flowpath is selected said first port is sealed by said sealing means, and when said fourth flowpath is selected said second port is sealed by said sealing means.

8. A valve assembly for controlling fluid flow through at least three flowlines, comprising:
a housing including;
at least three openings, each of said openings having means for engaging a corresponding one of said at least three flowlines in fluid coupling;
a cylindrical cavity formed therein having an inner wall defining at least three ports; and
at least three bores between each of said at least three ports and a corresponding one of said at least three openings;
flow control means, movably mounted within said cavity, for selectably completing a fluid path between selected ones of said at least three ports, said flow control means including a cylindrical spool having an outer wall; and
sealing means for preventing fluid migration from non-selected ones of said at least three ports into said central cavity, said sealing means including;
a circular recess formed in said outer wall of said cylindrical spool;
a resilient seal disposed within said circular recess, said seal including a sealing face having a contour corresponding to the cylindrical shape of said outer surface of said spool when said seal is disposed within said circular recess; and
means for retaining said seal within said circular recess,
whereby, when said resilient seal is disposed within said circular recess and when said spool is disposed within said cylindrical cavity, said sealing face sealingly engages said inner wall of said cylindrical cavity; and
wherein said means for retaining said seal includes;
a hub centrally situated within said recess; and
said resilient seal having a central opening therethrough for engaging said central hub when said seal is disposed within said recess.

9. A valve assembly for controlling fluid flow through at least three flowlines, comprising:
a housing including;
at least three openings, each of said openings having means for engaging a corresponding one of said at least three flowlines in fluid coupling;
a cylindrical cavity formed therein having an inner wall defining at least three ports; and
at least three bores between each of said at least three ports and a corresponding one of said at least three openings;
flow control means, movably mounted within said cavity, for selectably completing a fluid path between selected ones of said at least three ports, said flow control means including a cylindrical spool having an outer wall; and
sealing means for preventing fluid migration from non-selected ones of said at least three ports into said central cavity, said sealing means including;
a circular recess formed in said outer wall of said cylindrical spool;
a resilient seal disposed within said circular recess, said seal including a sealing face having a contour corresponding to the cylindrical shape of said outer surface of said spool when said seal is disposed within said circular recess; and
means for retaining said seal within said circular recess,
whereby, when said resilient seal is disposed within said circular recess and when said spool is disposed within said cylindrical cavity, said sealing face sealingly engages said inner wall of said cylindrical cavity; and
wherein said means for retaining said seal includes;
a pair of spaced apart posts situated within said recess, each of said posts including an outer face defining an annular space between the circumferential wall of said recess and said outer face, and each of said posts including a centrally located inner face defining a channel between each said inner face of said spaced apart posts; and a removable seal retainer including;
a cross bar adapted to be disposed within said channel between said posts; and
an end tab at each end of said cross bar, said end tab having a seal engaging face;
said resilient seal having a central opening therethrough for engaging said seal engaging faces of said end tabs when said seal is disposed within said recess.

10. A valve assembly comprising:
a housing defining a cylindrical cavity therein and at least three bores therethrough opening at a corresponding port in said cavity;
a cylindrical spool having at least three bores formed therethrough and intersecting therein;
means for mounting said spool within said cavity so that said valve can be rotated to align at least two of said at least three bores in said spool with a corresponding number of said at least three ports in said cavity;
a radial seal supported by said cylindrical spool for sealingly engaging said cylindrical cavity to prevent fluid leakage into said cavity, said radial seal including a sealing face adjacent said valve, said sealing face being defined by a dome, having an axis of symmetry, with a cylindrical relief along an axis perpendicular to said axis of symmetry and further having an inner circumferential surface; and
a seal retainer removably engaged within said radial seal and having a seal engaging face for press-fit engagement with said inner circumferential surface.

* * * * *